June 23, 1959     H. A. LANG     2,891,757
HANGER DEVICE
Filed Oct. 13, 1953

INVENTOR:
HERMAN A. LANG
BY
W. J. Stevenson

United States Patent Office 2,891,757
Patented June 23, 1959

2,891,757

HANGER DEVICE

Herman A. Lang, Santa Monica, Calif.

Application October 13, 1953, Serial No. 385,737

4 Claims. (Cl. 248—224)

This invention relates generally to hardware and particularly to an improved hanger or fastening device. Specifically, the invention is concerned with a two-part hanger designed for use in detachably mounting various objects, such as shutters, pictures, mirrors, advertising displays, flower boxes, bookcases, etc., against walls, doors and other flat, substantially vertical, surfaces.

Various forms of hanger devices are currently employed for demountably fastening articles of utility and ornamentation against walls and other vertical, planar surfaces. While such conventional hanger devices are used extensively, they are subject to several disadvantages. Conventional hanger devices frequently have two parts, namely a hook-like element which is fastened to the wall, and a loop element which is secured to the object to be attached to the wall and engageable with the hook element to mount the object against the wall. The components of such a hanger device are designed to fit relatively loosely when engaged and for this reason the object cannot be mounted with stability. That is to say, the supported object may have limited lateral movement and transverse movement toward and away from the wall. Such hanger devices also have the disadvantage of spacing the object at an appreciable distance from the wall to detract from the appearance of the mounting and to expose the devices to view. Moreover, such hanger devices are relatively expensive to manufacture, due to their unlike parts and, since the parts have projecting portions, they do not lend themselves to compact packing in envelopes or on cards for sale on the counters of hardware and other stores.

It is an important object of my invention to obviate the disadvantages and deficiencies of conventional fastening devices by providing a small, compact and inexpensive two-part hanger which is highly practical in use, said hanger being capable of supporting considerable loads without deformation.

Another object of the invention is to provide a hanger, of the character referred to, consisting of two identical parts, one securable against a supporting surface and the other attachable to the rearward side of an object to be supported, said parts being substantially coplanar throughout but having interengageable hook-like tongues offset transversely in opposite directions to an extent equal substantially to the thickness of the metal. By this provision, when the parts are engaged to mount the object against the wall, they are arranged in juxtaposition throughout their areas so that the object is mounted in very close relation to the wall and the hanger is concealed from view, this being another object and feature of the invention.

Another object of the invention is to provide a hanger, of the flush mounting type referred to above, in which each element has a centrally located vertical recess or groove aligned with its hook-like tongue and adapted to receive the tongue of the other element with a close sliding fit. By this provision, the hook-like tongues of the elements are guided into positive interengaging relation and, having been so interlocked, are held against relative movement in lateral and downward directions so that the object is retained in its initially placed position to prevent tilting thereof.

A further object of the invention is to provide a hanger device of the class specified in which the two identical elements are adapted for economical mass production, preferably as stampings from metal strip stock, with a minimum of waste.

Further objects of the invention will appear from the following description and from the accompanying drawing, which is for the purpose of illustration only, and in which.

Figure 1:
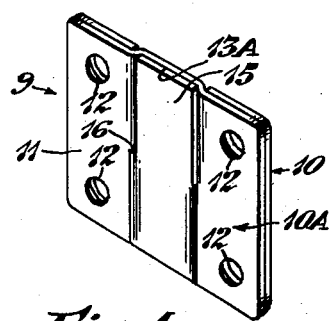
Fig. 1 is a perspective view of the improved fastener or hanger device, with its parts assuming their interlocked relation.
Figure 2:
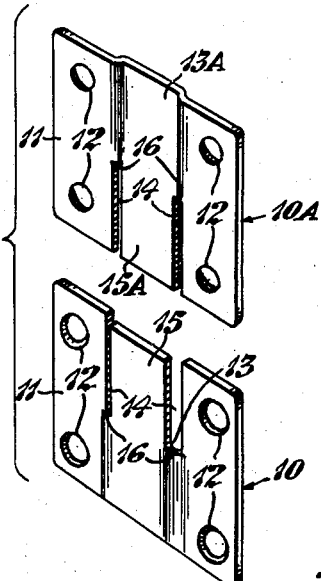
Fig. 2 is a similar view, showing the two elements disengaged.

Referring to Figs. 1 and 2 of the drawing in detail, the present improved fastener or hanger device 9 consists of a pair of identical mounting or hanger elements 10 and 10A, each produced as a sheet metal stamping in a suitable die. Each element 10 and 10A has a rectangular plate portion 11 provided with countersunk mounting holes 12 adjacent its corners.

The elements 10 and 10A are respectively provided with centrally located, vertically extending, offset portions forming grooves or channels 13 and 13A, the depth of which is equal to approximately the thickness of the metal. The metal at the sides of the channel portion of the element 10 is slotted as indicated at 14 throughout one-half its height, thus providing an upwardly extending tongue 15 formed by the continuation of the bottom wall of the channel portion. The companion element 10A is similarly slotted to provide a like tongue 15A extending throughout one-half the height of this element.

Figure 3:
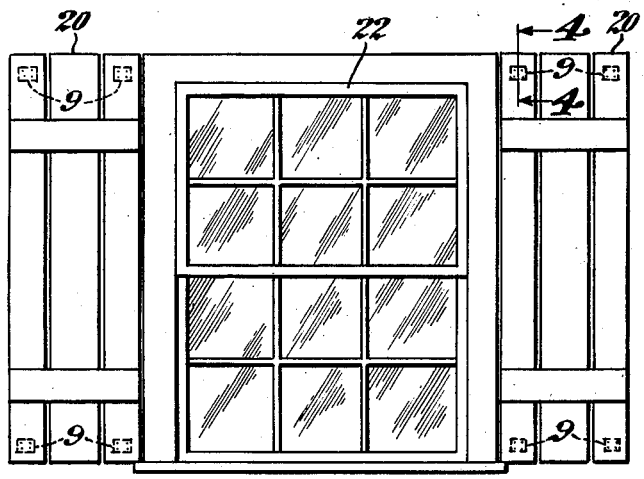
Fig. 3 is a face view of a window having associated ornamental shutters which are detachably mounted on the side of the building by means of the improved hangers.
Figures 4, 5:
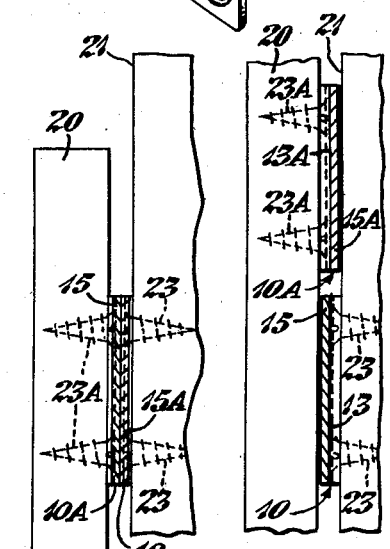
Fig. 4 is a cross-sectional view, taken on line 4—4 of Fig. 3.
Fig. 5 is a view similar to Fig. 4, illustrating the manner of engaging the hanger elements to mount the shutter.

The elements 10 and 10A are adapted to interfit as shown in Fig. 1 to form the mounting or hanger assembly. To interconnect the identical elements, they are arranged in reverse order so that the respective front and rear surfaces of the elements 10 and 10A face outwardly toward the person assembling the two parts and with the tongues 15 and 15A directed toward each other. By placing the elements 10 and 10A so that the rear side of the free ends of their tongues are in face-to-face engagement and then sliding the elements toward each other, the tongue 15 is caused to enter the groove 13A as the tongue 15A enters the groove 13. By this tongue-and-groove engagement, the hanger elements 10 and 10A provide a compact, flat unit having a combined thickness equal to only twice the thickness of the metal stock as shown in Fig. 1. The metal at the inner ends of the slots 14 provides stop shoulders 16 which engage to locate the elements vertically relative to each other and to support the weight of the object to be mounted by the device. Due to the snug fit of the tongues 15 and 15A in the respective channels 13A and 13, relative sidewise movement between the elements is prevented. The hanger device 10, 10A is applied to use in the following manner:

Referring to Figs. 3 to 5, let it be assumed that it is desired to detachably mount the shutters 20 against the outside wall 21 of a home, at the sides of a window 22. To so mount each shutter 20, a suitable number of the hangers are employed, the elements 10 of each hanger device being secured against the wall 21 by flathead wood screws 23 passing through the holes 12 with their heads seated in the countersunk portions of the holes. In a like manner, the parts 10A of the hanger devices are secured in place against the back side of the shutters by screws 23A, care being taken to locate these parts at the same spacing as the parts 10. In the typical example illustrated in Fig. 3, four hanger devices are utilized for securing each shutter 20 in place but the number and location of the devices may vary in accordance with the size and weight of the shutters.

With the companion parts 10 and 10A now applied respectively against the wall 21 and the back of the shutter 20 in the relative positions shown in Figs. 2 and 5, the shutters may be mounted against the wall 21. This is readily accomplished by first placing each shutter so that its hanger elements 10A rest against the wall directly above the elements 10 fastened to the wall (Fig. 5). The shutter is then lowered gradually to cause the tongue 15 and 15A to enter the respective grooves or channels 13A and 13, lowering of the shutter being limited by the engagement of the stop shoulders 16 (Fig. 4).

Each shutter is thus mounted at the side of the window 22 and flat against the wall 21 of the building structure. Due to the close fit between the interengaging tongues and grooves, the shutters are held against relative sidewise and transverse movement so that rattling of the shutters due to wind is effectively avoided.

Ornamental shutters of the type shown in Fig. 3 are ordinarily fastened in place against the building wall by wood screws which pass through drilled holes in the shutters and are screwed into the wall. While such fastening means provide a secure mounting, it is necessary to conceal the heads of the screws with putty and paint. Moreover, when it becomes necessary to detach the shutters in order to paint the house or to caulk the window frame, removal of the embedded screws is obviously necessary. By the use of the present improved hanger devices, all mechanical elements are concealed and a shutter may be readily removed from the side of the building by simply sliding it upwardly to disengage the interlocking tongues of the parts of its hanger devices, whereupon the shutter can be removed bodily from the wall and later restored to its mounted position by reversing the above procedure.

Figure 6:
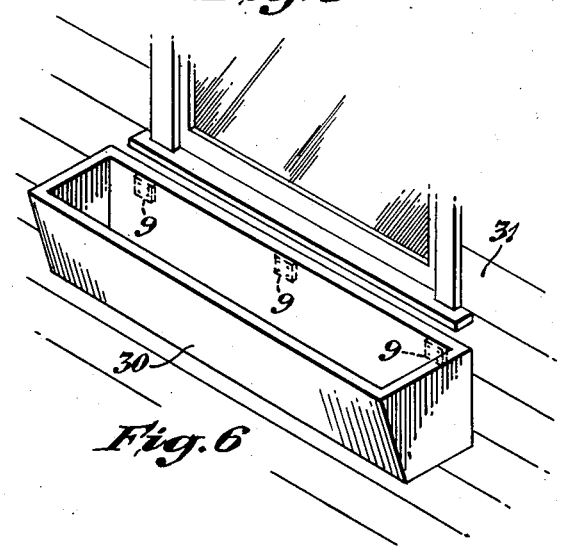
Fig. 6 is a perspective view of a readily demountable flower box fastened to a wall by the hanger devices.

The present hanger device is suitable for use in supporting various other objects against walls, doors and other vertical surfaces. For example, two or more of the devices 10, 10A may be employed for detachably mounting a flower box 30 against a building wall 31 as illustrated in Fig. 6. In a like manner, screens, pictures, mirrors and other flat articles can be hung on walls, doors and other vertical surfaces by means of the hanger devices.

Due to the fact that the load is taken in the plane of the flat device, relatively heavy articles can be supported by the device without the possibility of breaking or bending of its parts or displacement of the mounting screws. It is thus seen that the present invention provides a simple, yet highly practical hanger device for detachably mounting various objects.

Due to the fact that the device consists of two identical parts adapted for mass production as metal stampings, the device can be manufactured and sold at a very low price to the consumer. Also, because of its compact, flat nature, the device lends itself to convenient packaging within an envelope or upon a display card.

While the device has been herein disclosed as particularly adaptable for use in detachably mounting various objects against vertical surfaces, it will be apparent that the device may also be employed for demountably fastening objects to horizontal and other surfaces. For example, a pair of the elements 10 may be secured to the top of a work-bench and a pair of the other elements fastened to the bottom of an electric motor arranged to drive a saw or other tool through the medium of a driving belt. In such a mounting, the tongues of the elements are engaged to hold the motor in position on the bench to maintain the belt taut, the elements being readily disengaged to loosen the belt when desired.

In accordance with the provisions of the patent statutes, I have herein described the principle of the invention, together with the construction which I now consider to represent the best embodiment thereof. I wish to have it understood, however, that the hanger device is susceptible of various modifications which would fall within the spirit and scope of the invention, as defined in the appended claims.

I claim as my invention:

1. A hanger device for detachably mounting an object against a vertical wall or the like, comprising: a pair of identical hanger plates, each having a flat, vertical plate portion, a central channel portion providing a vertical groove extending throughout the entire vertical length of the plate, and a vertical tongue offset from the plane of the plate portion, one of said plates being secured against the wall and the other plate being secured against the back side of the object, said hanger plates being releasably coupled with the tongue of one plate directed upwardly and the tongue of the other plate directed downwardly, the tongue of each plate being engaged in the vertical groove of the other plate and the plate portions of the plates being in flat butted and registered and registering engagement with each other.

2. A hanger device for detachably mounting an object against a vertical wall or the like, comprising: a pair of identical hanger plates, each having a flat, vertical plate portion, a central channel portion providing a vertical groove extending throughout the entire vertical length of the plate, and a vertical tongue offset from the plane of the plate portion, the depth of the channel being substantially equal to the thickness of the plate portion, one of said plates being secured against the wall and the other plate being secured against the back side of the object, said hanger plates being releasably coupled with the tongue of one plate directed upwardly and the tongue of the other plate directed downwardly, the tongue of each plate being engaged in the vertical groove of the other plate and the plates being in register with their plate portions in flat sliding and registering engagement with each other.

3. A hanger device for detachably mounting an object against a vertical wall or the like, comprising: a pair of identical, sheet metal hanger plates, each having a flat, vertical plate portion provided with holes for receiving mounting screws, a raised, central channel portion providing a shallow groove, the bottom of the channel portion being offset from the plane of the plate portion a distance substantially equal to the thickness of the sheet metal, the plate having vertical slots at the sides of said channel portion discontinuing the sides of the channel portion throughout one-half the height of the plate, the metal between the slots being a continuation of the bottom of the channel and providing a tongue having a width substantially equal to the width of the groove, one of said plates being secured to the wall with its tongue directed upwardly and the other plate being secured against the back of the object with its tongue directed downwardly, the object being positioned against the wall with the plates coupled and so that the tongue of each hanger plate lies in the groove of the other hanger plate and so that the plates are in register with each other.

4. A fastening device for detachably mounting an object against a relatively flat surface, comprising: a pair of identical sheet metal elements each being of flat rectangular plate form and having a central, vertical channel providing a vertically extending raised portion at the outer side of the element and defining a vertically extending groove at the inner side of the element, slots in the metal at the sides of the channel at the upper half thereof, said slots being of a width slightly greater than the thickness of the sheet metal, the upper half of said raised portion disposed between said slots providing a tongue and the bottom of each slot providing a shoulder, one of said elements being securable against said surface with its tongue directed upwardly and spaced from the surface and the other element being securable against the back of the object with its tongue directed downwardly and spaced from said back of the object, the object being placeable against said surface with the outer sides of the elements abutting, the object being movable in a direction to cause the tongue of each element to enter the groove of the other elements, the shoulders of said elements interengaging to limit movement of the object in said direction, the combined thickness of the two interlocked elements being equal to substantially twice the thickness of the sheet metal, the said plates being in register with each other when assembled.

References Cited in the file of this patent

UNITED STATES PATENTS

| | | |
|---|---|---|
| 1,564,715 | Russell | Dec. 8, 1925 |
| 1,823,490 | Goldfinger | Sept. 15, 1931 |
| 2,103,106 | Yurkovitch | Dec. 21, 1937 |
| 2,126,630 | Gleitsman | Aug. 9, 1938 |
| 2,299,443 | Walmsley | Oct. 20, 1942 |